United States Patent [19]

Lormeau et al.

[11] Patent Number: 5,019,649

[45] Date of Patent: May 28, 1991

[54] METHOD FOR OBTAINING BIOLOGICALLY ACTIVE MUCOPOLYSACCHARIDES OF HIGH PURITY, BY CONTROLLED DEPOLYMERIZATION OF HEPARIN

[75] Inventors: Jean-Claude Lormeau, Maromme; Maurice Petitou; Jean Choay, both of Paris, all of France

[73] Assignee: Choay S.A., Paris Cedex, France

[21] Appl. No.: 111,087

[22] Filed: Oct. 19, 1987

Related U.S. Application Data

[63] Continuation of Ser. No. 780,729, Sep. 27, 1985, abandoned, which is a continuation of Ser. No. 448,639, filed as PCT FR82/00069 on Apr. 9, 1982, abandoned.

[30] Foreign Application Priority Data

Apr. 10, 1981 [FR] France .................................. 81 07283

[51] Int. Cl.$^5$ .............................................. C08B 37/10
[52] U.S. Cl. ...................................................... 536/21
[58] Field of Search .......................................... 536/21

[56] References Cited

U.S. PATENT DOCUMENTS

| | | | |
|---|---|---|---|
| 4,303,651 | 12/1981 | Lindahl et al. | 424/183 |
| 4,351,938 | 9/1982 | Barnett | 536/21 |
| 4,401,662 | 8/1983 | Lormeau et al. | 424/183 |

FOREIGN PATENT DOCUMENTS

| | | | |
|---|---|---|---|
| 8102737 | 10/1981 | PCT Int'l Appl. | 424/183 |
| 8103276 | 11/1981 | PCT Int'l Appl. | 424/183 |
| 2002406 | 2/1979 | United Kingdom | 536/21 |
| 2035349 | 6/1980 | United Kingdom . | |

OTHER PUBLICATIONS

Shively et al., Formation of Anhydro Sugars in the Chemical Depolymerization of Heparin, Biochemistry 15 (18), pp. 3932–3942 (1976).
Cifonelli, Nitrous Acid Depolymerization of Glycosaminoglycans, Chem. Abstracts 85:89445z (1976).

*Primary Examiner*—John W. Rollins
*Attorney, Agent, or Firm*—Weiser & Stapler

[57] ABSTRACT

Method for obtaining biologically active mucopolysaccharides by controlled depolymerization of heparin, wherein the quantity of products generating nitrous acid is selected so that those products are totally consumed when the desired depolymerization degree is reached.

4 Claims, No Drawings

METHOD FOR OBTAINING BIOLOGICALLY ACTIVE MUCOPOLYSACCHARIDES OF HIGH PURITY, BY CONTROLLED DEPOLYMERIZATION OF HEPARIN

This application is a continuation of application Ser. No. 06/780,729, filed Sept. 27, 1985, now abandoned, which is a continuation of application Ser. No. 06/448,639, filed as PCT FR82/00069 on Apr. 9, 1982, now abandoned.

The invention relates to a novel method for obtaining biologically active mucopolysaccharide compositions of high purity, by the controlled depolymerization of heparin.

It relates more particularly to a process of the type concerned enabling the production of a mixture of high homogeneity in mucopolysaccharides (these products will be denoted below by the abbreviation MPS) capable especially of controlling, in a highly specific manner, certain stages of blood coagulation and, in particular, possessing a more selective activity than heparin with respect to a smaller number of factors of coagulation, particularly of the activated factor X or factor Xa of the blood.

Taking into account their properties, these MPS constitute valuable medicaments, particularly antithrombotic. It is then possible to understand the advantage, for the therapeutic uses contemplated, of having available MPS of high purity, in particular practically completely freed of the contaminants that the reaction medium can introduce, whilst resorting only, for their production, to operational steps which are easy to put into practice whose cost and realisation permit exploitation on the industrial scale.

For the production of compounds of this type, the inventors are more especially interested in the controlled depolymerization of heparin under the effect of a chemical agent capable of fragmenting the chains which constitute it, in particular nitrous acid.

It will be noted that the term heparin is used in the description and the claims in its broadest sense, to denote indifferently a commercial heparin preparation of pharmaceutical quality or a crude heparin such as obtained by extraction from biological materials, in particular from mammalian tissues.

Now, in a general manner, the depolymerization processes proposed until now lead to depolymerization mixtures containing numerous contaminants, particularly nitrites and nitrates derived from the unreacted nitrous acid. It then appears necessary, to purify with care, in the course of additional steps, the MPS compositions of these mixtures before using them in therapeutics.

In addition, the practising of the reaction to the desired degree of depolymerization requires strict control of the progress of the depolymerization in order to arrest the latter to prevent too extensive a depolymerization.

The research by the inventors for means enabling the production of the desired MPS more satisfactorily has led them to study different conditions of realisation of a controlled depolymerization of the heparin.

The studies carried out then showed that in selecting one of the parameters of the reaction as a function of the other parameters used, it was possible to obtain with high yields, a depolymerization mixture with a high anti-Xa (YW) activity, generally higher than 200 u, even 250, practically free of contaminants of the nitrite-nitrate type and to avoid, during the reaction, the checking of the depolymerization to arrest the latter when the desired degree is reached.

It is hence an object of the invention to provide a novel process enabling the production of particularly valuable MPS with regard to the desired biological properties, whilst being practically free of any contaminants such as nitrites and nitrates and which are hence thereby found to be produced in a particularly suitable form for their uses in therapeutics.

It was also an object to provide a process enabling the production of these MPS without having to exert strict checking of the reaction time to arrest the latter as soon as the desired degree of depolymerization is reached, the degree of depolymerization being adjusted at will.

It is aimed also at providing a process whose practising on the industrial scale is rendered extremely easy by reason of the particular conditions selected for the controlled depolymerization of the heparin.

The process for obtaining biologically active MPS compositions according to the invention is characterized by the fact that heparin and nitrous acid or, preferably, the reagents used to generate it in situ, are used in respective concentrations such that when the desired degree of depolymerization is reached, the nitrous acid, or as the case may be, the reagents used to generate it in situ, are entirely consumed, these concentrations of reagents and the conditions of the reaction other than these concentrations being advantageously adjusted as a function of one another so as to permit the production of a controlled depolymerization of the starting heparin chains leading to the desired MPS and, after stopping by itself of the reaction, there are separated from the reaction medium the products of the type of those which are precipitable by an alcoholic solvent and they are recovered.

The advantage of these features is found to be particularly valuable with respect to the biological applications contemplated for the products. In fact, the MPS compositions recovered from the depolymerization mixture are practically entirely free of toxic substances. In particular, these compositions do not contain nitrites nor nitrates. Considering the total consumption of the nitrous acid and the removal in gaseous form of the nitrogen-containing substances, such derivatives can be formed, which enables the avoidance, after the reaction, of any contamination, by toxic nitrated compounds, of the compositions produced.

This process presents, in addition, a considerable advantage at the level of the production technique.

In fact, due to the features used, the depolymerization reaction is, in away, "self-regulating", stopping itself when the desired depolymerization degree is obtained.

The handicap of checking the duration of the reactions which is made necessary in the prior techniques in order to avoid too extensive a depolymerization of the chains of the heparin, is thus avoided.

According to the invention, instead of conforming with the reaction kinetics, arising from the parameters used until now and, particularly, from the concentrations of reagents, the concentration of nitrous acid generating substances so as to obtain the desired depolymerization is selected so that the depolymerization stops due to the fact of the disappearance, by total consumption, of one of the reagents, when the desired products are obtained.

The amount of nitrous acid utilised, or of products used to generate it in situ, must be sufficient to obtain a satisfactory yield of depolymerization products of the desired quality, but must not exceed a limit beyond which, taking into account the amount of heparin utilised, the nitrous acid would not be fully consumed.

According to a preferred embodiment of the invention, there is utilised about 0.02M to 0.1M, particularly from 0.03M to 0.05M approximately of $NaNO_2$ with a heparin solution at about 8 to 12% by weight.

The above features are advantageously applied in a controlled heparin depolymerization process in which, the conditions of the reaction other than the concentrations of reagents, enable more especially the production of MPS having an anti-Xa activity (Yin-Wessler) of at least about 200 u/mg, advantageously higher than 250 u/mg, a USP or APTT activity less than about 30 iu advantageously less than 20 iu or even about 10 iu and a ratio of their Y-W/USP titer or of their YW/APTT titer of about at least 3, advantageously higher than about 6, even 10 or more, formed to a major extent of species having a molecular weight of about 2,000 to 8,000 daltons (determined by the HPLC method).

It is recalled that the Yin-Wessler titer corresponds more specifically to the capacity of the active fractions to potentiate the inhibition of the Xa factor of the blood by antithrombin III in the corresponding test, measured according to the technique of these authors which is described in "J. Lab. Clin. Med.", 1976, 81,298-300.

The USP titer which enables the measurement of an overall coagulation intensity under well-determined conditions is also well known. It is determined as described in the Pharmacopoea of the United States XIX, pp 229-230 (see also Second Supplement USP-NF, p. 62, and the Fourth Supplement USP-NF, page 90, respectively entitled "Drug Substances and Dosage Forms" (medicinal substances and administrative forms)).

The APTT titer (abbreviation of the English term "activated partial thromboplastin time") also measures the overal anticoagulant activity. This titer is the equivalent of the Cephalin-Kaolin time measured according to J. Caen et al "l'hemostase", edition extension scientifique, 1976, p. 169-170.

Preferentially, the raw material applied in the process of the invention is constituted by a heparin having a molecular weight of about 2,000 to 50,000.

It may be a heparin of conventional injectable pharmaceutical quality, or a crude heparin, such as is obtained at the end of extraction operations of this active principle from mammalian tissues or organs, particularly from intestinal or lung mucus, for example from pork or from beef. It may also be constituted by the products which are normally put aside in the purification of heparin in order to produce a heparin of injectable quality and of higher specific activity.

The heparin applied is subjected, under controlled conditions, to the actions of a chemical agent, more particularly nitrous acid. This acid may be added to the heparin or formed in situ by the addition, in controlled amounts, of an acid, to a derivative of nitrous acid, in particular, a salt, an ether-salt, more especially an alkali or alkaline-earth salt.

In an advantageous embodiment of the invention, there is used as salt of nitrous acid, a water soluble salt, more especially an alkali salt such as sodium nitrite $NaNO_2$.

To generate the nitrous acid in situ, controlled amounts of an acid advantageously containing biologically acceptable anions, such as acetic acid and more especially hydrochloric acid, are added.

The action of the nitrous acid on the heparin is advantageously carried out in a physiologically acceptable medium, thus enabling the avoidance of any problem which may result through the elimination of a solvent detrimental for the contemplated biological applications. In this respect, water constitutes the preferred reaction medium.

In accordance with the invention, the concentrations of heparin and of nitrous acid of the solution are selected so that when the desired degree of depolymerization is reached, the nitrous acid is entirely consumed, the other parameters coming into play for the realisation of this reaction, in particular temperature and pH, being in addition also adjusted with respect to one another in order to obtain the desired products under the most satisfactory experimental conditions.

The study of these experimental conditions by the inventors has shown that it is advantageous to apply the heparin and the products generating the nitrous acid in amounts leading to a final concentration of at least 8% by weight of the solution in heparin, advantageously of the order of 8 to 12%, especially close to 10%, the final concentration in sodium nitrite then being from about 0.02M to 0.1M and preferably 0.05M and even better 0.055M. Taking into account the high concentrations of heparin, the volumes to be handled for the practising of the process according to the invention, are considerably reduced, by a factor of at least 5 with respect to the usual chemical techniques.

The tests carried out have shown that it was appropriate to operate from about 0° to 30° C. Temperatures lower than 10° C. may be used, for the production of the desired products. Advantageously, operations are at room temperature. The acid is used in amounts enabling the production of the desired pH advantageously about 2 to 3, preferably close to 2.5.

As already stressed, these conditions enable strict checking of the duration of the reaction to be avoided. They permit, in fact, self-regulation of the controlled depolymerization reaction according to a principle which is distinguished from that applied in known processes, which is manifested by a difference at the level of the results, namely the absence of nitrites and nitrates in the reaction medium at the end of the reaction, the nitrogenous compounds formed being volatile.

These conditions enable, in addition, the specific production of products corresponding to a given profile which will be specified below.

When the nitrous acid applied is exhausted, the desired depolymerization degree is reached and from the depolymerization medium are precipitated products of the type of those which are precipitable by alcohol. Previously, the pH is advantageously readjusted to a value close to neutral.

For the precipitation operation, it is advantageously resorted to absolute ethanol. Tests carried out have enabled the observation that by using about 2 volumes of ethanol, the desired precipitation of the biologically active MPS is produced. The low volume of solvent used for this precipitation will be noted, which presents numerous advantages at the handling level.

The precipitate formed is recovered and, for its use, washed and dried.

The application of the foregoing features enables the production of products characterised particularly by the following points.

These products, like the MPS described in French Patent Application FR No. 78 31357 of 6.11.1978 in the name of Applicant, are soluble in a water-alcohol medium (water-methanol), having a titer of 55°–61° GL, preferably 58° GL; they tend towards insolubility in a water-ethanol medium whose alcohol content is higher; they are insoluble in pure alcohol. They have, in addition, Y-W titers of about at least 200 u/mg advantageously higher than about 250 u/mg and USP or APTT titers less than at least 50 iu, advantageously 30 iu, even 20, and ratios of U-W to USP or APTT titers at least 3, preferably at least higher than about 6, particularly higher than about 10; they include terminal units having the basic 2,5-anhydro-D-manno basic structure whose primary alcohol function at the 6 position is substituted or not by a $-SO_3^-$ group.

This terminal unit corresponds to the following formula:

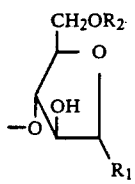

where $R_1$ can represent a functional group selected particularly from among the groups aldehyde, alcohol or carboxylic acid or their derivatives, particularly acetals, amides, ethers, esters or corresponding salts and $R_2$ a hydrogen atom or an $SO_3^-$ group. The functional groups of $R_1$ other than the aldehyde group are introduced advantageously by the method described by Applicant in the application for the second certificate of addition FR Pat. No. 80 06282 of Mar. 20, 1980 to patent application FR Pat. No. 78 31357 of Nov. 6, 1978.

In an advantageous aspect of the invention, $R_1$ is constituted by an aldehyde group. In another aspect $R_1$ is constituted by a carboxylic acid group or again alcohol, these groups having particularly the advantage of high stability.

Again preferably, the products obtained according to the invention are constituted by a major part of species of molecular weight of about 2,000 to 8,000 daltons, which corresponds to structures having from about 8 to 40 saccharide entities (the molecular weights are measured as indicated above by the HPLC method, by means, for example, of a 0.5M sodium sulphate buffer).

As obtained, these products are devoid of contaminants of the nitrate-nitrite type.

In general, these products are particularly valuable by reason of their pharmacological properties of great interest. They possess, in fact, an anti-Xa (YW) activity well above that of the starting heparin whilst their USP or APTT titer (which manifest the overall anticoagulant activity) may be very much less than that of heparin, which facilitate their use and reduces the risk of hemorrhagic accidents.

They are hence advantageously usable as medicaments, particularly as antithrombotic agents.

In addition, their low molecular weight with respect to that of the starting heparin confers on them a delayed pharmacokinetic action of great value in therapeutics. They may in addition be advantageously utilised orally.

The conditions reported above of practising the process of the invention may lead advantageously to compositions practically no longer containing normal heparinic chains, that is to say chains from the starting heparin. It is, in fact, a process with a high yield.

It is hence thus possible to have availabe MPS compositions of high homogeneity of molecular weight comprised within the above-indicated range, containing advantageously at least about 98% of MPS as stated above.

According to the starting compound, this homogeneous nature may however be modified.

By operating according to other embodiments of this invention, particularly under more dilute conditions as regards the reaction medium, MPS compositions are obtained, which can contain up to 5 and even up to about 10% by weight of heparinic chains of molecular weight higher than 10,000 daltons, manifesting less depolymerization of the starting chains.

By applying, for example, dilute heparin solutions in the proportion of a factor of about 5 with respect to the conditions specified and nitrous acid solutions, or more especially the derivatives generating it in situ, diluted in the proportion of a factor of about 10, MPS compositions of about 3,000 to 6,000 daltons are obtained which can contain from about 5 to 10% of chains with a higher molecular weight, of the order of 10,000 or more and whose YW titers are from about 100 to 200 u/mg, the USP titers less than about 50 iu and more customarily comprised between about 40 and 50, with YW/USP titer ratios of the order of about 5 to 6.

Other features and advantages of the invention appear in the Examples which follow.

EXAMPLE 1

Self-Regulated Depolymerization of Heparin and Production of MPS of Low Molecular Weight Into 15 liters of distilled water at +20° C., 1,500 grams of commercial heparin having a YW/USP ratio in the vicinity of 1 and a USP titer of 160 iu, are dissolved. 51.8 g of sodium nitrate dissolved in 300 ml of distilled water are added, and immediately the pH is lowered to 2.5 by pure hydrochloric acid.

The reaction then takes place and its progress is checked until the absence of nitrous ions. After 40 minutes, the presence or absence of nitrous ions is checked at regular intervals in the reaction medium. Starch-iodine paper, for example, is used, checking every 5 minutes. After about 60 minutes of reaction, the nitrous acid had been entirely consumed and no more $NO_2^-$ ions remained in the reaction medium. The pH was then adjusted to 7 with pure caustic soda, and the products of the reaction were recovered by the addition of 31 liters of pure ethanol (2 volumes). The precipitate formed was collected by centrifugation, washed with ethanol and dried at 60° C. under vacuum. 1,200 g of products having the following characteristics were collected:

USP titer: 19 iu/mg
APTT titer: 13 iu/mg
Yin and Wessler titer: 202 u/mg
Nitrites/nitrates content: <4 ppm

EXAMPLE 2

By proceeding as in Example 1, starting from a 10% heparin solution (100 g/l), MPS are obtained having YW/USP ratios according to the amount of $NaNO_2$ employed, namely:

| NaNO$_2$ | YW Titers over USP Titers of the MPS | Value of the Ratio of the Titers |
| --- | --- | --- |
| 0.03 M | (140/51) | 2.7 |
| 0.04 M | (214/26) | 8 |
| 0.05 M | (250/19) | 13 |
| 0.06 M | (194/12) | 16 |
| 0.07 M | (201/9) | 22 |
| 0.08 M | (132/6.4) | 19 |
| 0.1 M | (110/2) | 44 |

Preferred MPS correspond to those obtained by using from 0.03 to 0.07M, particularly from 0.03 to 0.05M and more especially those obtained at 0.05M.

EXAMPLE 3

In 10 liters of distilled water, at room temperature (15°-20° C.) 1,000 grams of commercial injectable heparin having a USP titer of 170 iu/mg and a YW titer of 160 u/mg, are dissolved. 38 g of sodium nitrite (final molarity 0.055M) dissolved in 200 ml of water, is added. The pH is immediately lowered to 2.5 by pure hydrochloric acid. The reaction is checked as in Example 1 at regular intervals of time (5-10 minutes). After 30 minutes, NO$_2^-$ ions are no longer detected in the reaction medium. The pH is then adjusted to 7 with 5N soda; the products of the reaction are recovered by the addition of 21 liters of pure ethanol (2 volumes). The precipitate formed is collected by centrifugation, washed with ethanol and dried at 60° C. under vacuum.

Finally there are obtained 780 grams of white coloured powder having the following characteristics:
USP Titer: 22 iu/mg
Yin and Wessler Titer: 260 u/mg
APTT Titer: 10 iu/mg
Content of nitrites-nitrates: 5 ppm
Average molecular weight: less than 6,000
Percentage of species whose molecular weight exceeds 10,000: less than 1%

We claim:

1. In a self-regulated process for depolymerizing a heparin in an aqueous solution by providing about 0.02 to 0.1M nitrous acid and a pH of about 2 to 3 in said solution, so that an endpoint of said depolymerization process occurs when all the nitrous acid has been consumed and mucopolysaccharides are produced from said heparin having an average molecular weight of less than 6,000 daltons, the improvement in said process which comprises said aqueous solution containing about 8 to 12 weight percent of said heparin.

2. The process of claim 1, wherein said aqueous solution contains about 10 weight percent of said heparin.

3. The process of claim 1, wherein there is supplied 0.03 to 0.05M nitrous acid to said aqueous solution.

4. The process of claim 3, wherein said nitrous acid is formed in situ in said aqueous solution from sodium nitrite and hydrochloric acid.

* * * * *